UNITED STATES PATENT OFFICE.

REIDAR NIELSEN AND VICTOR MORITZ GOLDSCHMIDT, OF CHRISTIANIA, NORWAY, ASSIGNORS, BY MESNE ASSIGNMENTS, TO TITAN CO. A/S., OF CHRISTIANIA, NORWAY.

TITANIUM PRODUCTS AND THE PROCESS OF PRODUCING SAME FROM PRECIPITATED TITANIUM HYDRATES.

1,343,469.   Specification of Letters Patent.   Patented June 15, 1920.

No Drawing.   Application filed October 12, 1917. Serial No. 196,315.

*To all whom it may concern:*

Be it known that we, REIDAR NIELSEN and VICTOR MORITZ GOLDSCHMIDT, subjects of Norway, and residents of Christiania, Kingdom of Norway, have invented certain new and useful Improvements in Titanium Products and Processes of Producing Same from Precipitated Titanium Hydrates, of which the following is a specification.

This invention relates to the manufacture of materials suitable for use as pigments and for other technical purposes. It has for its object the production of such materials from crude titanium hydrates and contemplates both the products formed and the method by which they are obtained.

When titanium hydrates are precipitated from a solution of titanium salts an acid substance either in the form of a basic titanium salt or an adsorbed acid is thrown down and renders the precipitated hydrates unsatisfactory for pigment use, chiefly because of its disintegrating effect upon the vehicle with which the pigment is subsequently mixed. This acid substance has been found to adhere with great persistence to the hydrated titanium and its removal by washing has, from a practical standpoint, been found impossible.

This invention has to do with the elimination or removal of this acid substance in such a manner that upon its removal or elimination a plurality of compounds are formed which go to make up the final product. We prefer to carry the process to the extent that one of the materials present in the final product is an oxygen compound of titanium with another metal, but this is purely a matter of preference and the invention is not intended to be limited to the formation of such a compound.

Broadly speaking the invention is carried out by the addition to the crude titanium hydrates of the compound of an alkaline earth metal which upon reaction evolves an inactive gas which on passing up through the mass renders it porous and homogeneous. The compound chosen for this purpose should preferably be one in which the metal thereof whether only associated in a separate compound with the final titanium compound or both associated therewith in this manner and combined with titanium does not materially interfere with the hiding power of the pigment or cause disintegration of the vehicle.

Where the product is to be employed as a pigment or in uses demanding similar characteristics, it should be calcined until the water of hydration is driven off and we prefer to continue the calcination until the titanium oxid formed is converted into a crystalline modification as set forth in Norwegian Patent No. 28,216 which is embodied in United States patent application Sr. No. 196,327, filed by Victor Moritz Goldschmidt, October 12, 1917.

Where it is desired to obtain a compound of titanium with the alkaline earth metal in the final product, an excess of the alkaline earth compound to that required to combine with the undesired acid substance present will be used. The compound of titanium with the alkaline earth metal is obtained by calcining to a sufficient degree to bring about the necessary reaction, and here too we prefer that the titanium oxid of the final product be in the crystalline form as above set forth. Our preference to the use of an excess of an alkaline earth compound and the resultant presence in the final product of an oxygen compound of the titanium with the alkaline earth metal is due in part to economy and is based on the discovery that such a compound possesses in itself good pigment values. It is characterized by a high refractive index and a low solubility. For example, calcium titanate, $CaTiO_3$, has a refractive index of 2.4 in sodium light and is very resistant to chemical action. By the employment of calcium carbonate, perhaps the most available alkaline earth compound, a good pigment composed in part of calcium titanate can be produced, which in proportion to the amount of this compound present is much cheaper than one in which all of the titanium present is in the form of an oxid.

The precipitated hydrates which we prefer to employ are those thrown down from a sulfate solution such for example as one formed in accordance with Norwegian Patent No. 27,292 which is embodied in United States patent application Sr. No. 196,977, filed by Gustav Jebsen, October 12, 1917.

In the following specific illustration of our invention we will accordingly make use of calcium carbonate and the precipitated hydrates just referred to but in so doing we wish it understood that our invention is not intended to be limited thereby.

The hydrates chosen for illustration may be used directly after precipitation and washing without intermediate drying. The mass is then placed in a suitable container and intimately mixed with the desired quantity of calcium carbonate. For this purpose finely pulverized limestone can be employed and a mechanical mixer made use of. Assuming that it is desired to have calcium titanate in the final product, the quantity of calcium carbonate employed will be sufficiently in excess of that required to combine with the $SO_4$ radical present in the precipitate to supply the required calcium for the titanate sought. Reaction takes place immediately and calcium sulfate and carbon dioxid are formed. The calcium sulfate remains with the precipitate and the carbon dioxid passing off through the mass gives it a spongy homogeneous character. The other reactions taking place depend upon the character of the undesired acid substance of the precipitate. If it is in the form of a basic sulfate, in addition to the calcium sulfate and carbon dioxid, titanium hydroxid will be formed, it being borne in mind that the mixture is moist and contains enough water for this purpose. If the undesired acid substance is in the form of a free acid, only calcium sulfate, carbon dioxid and water will be formed.

The mass resulting from the above action is ready for calcination and to this end is placed in a suitable calcining furnace, preferably one of the rotary type, and calcined.

In calcination the hydrated oxids of titanium are freed from the combined water and converted into titanium dioxid. As calcination proceeds, the excess of calcium carbonate reacts with its equivalent part of titanium oxid and forms calcium titanate. Should this compound be formed prior to changing the remaining titanium oxid from its amorphous modification to one of the crystalline modifications as above referred to, we prefer that the calcination be continued until this is brought about.

The calcination and the reactions taking place thereon are greatly aided by the spongy homogeneous character of the mass and its freedom from lumps; the product is uniform and especially suited for pigment and other technical uses.

If it is desired not to have calcium titanate in the final product, the amount of calcium carbonate added to the precipitated titanium hydrates will be just sufficient to combine with the $SO_4$ radical present therein. In this case, the process is carried on as above stated, no titanate being formed. As the hydrated oxids of titanium are freed from the combined water at a lower temperature than that required for the formation of calcium titanate, calcination may be arrested if desired before crystallization has taken place but here as before we prefer that it be continued until the titanium oxid is changed to one of its crystalline modifications.

Where the product with or without calcium titanate present is to be used as a pigment, it may be pulverized or otherwise rendered in suitable form for grinding with the vehicle to be employed.

The product is substantially white, does not discolor under the action of light and does not destroy the vehicle; it can be mixed in all proportions with well known pigments such as basic carbonate white lead, sublimed white lead, zinc oxid and lithopone; it has great hiding and covering power, and is suitable for use in practically all classes of paints.

As a specific illustration of the invention above set forth we have in making use thereof employed for example the following materials in the proportions indicated:

100 kilograms of precipitated hydrates containing 44.0 per cent. $TiO_2$, 3.4 per cent. $SO_3$, 9.7 per cent. $H_2O$, (combined,) 42.9 per cent. water, and with this we intimately mixed 5.72 kilograms of finely pulverized $CaCO_3$ and proceeded as above set forth.

The resultant product comprised a mass composed of 84.0 per cent. $TiO_2$, (in the crystalline modification,) 3.8 per cent. $CaTiO_3$ and 12.2 per cent. of $CaSO_4$. We reduced this mass to an impalpable powder and ground it with linseed oil to form a paint, which we used with excellent results.

The word "hydrates" as used herein is employed as a general term, and includes hydrated oxids with or without more or less basic salts or adsorbed acid.

The foregoing detailed description has been given for clearness of understanding and no undue limitation should be deduced therefrom but the appended claims should be construed as broadly as permissible in view of the prior art.

What we claim as new and desire to secure by Letters Patent of the United States is:

1. The process of treating titanium hydrates containing an undesired acid substance whereby the said undesired acid substance is eliminated, which comprises treating the titanium hydrates with a compound of a metal which on reacting with the said acid substance forms a plurality of compounds, one being a neutral and relatively insoluble salt and another a gas.

2. The process of treating precipitated titanium hydrates containing an undesired acid substance embracing the $SO_4$ radical whereby the said undesired acid substance is eliminated, which comprises washing the precipitate and treating the washed precipitate with a compound of a metal, the sulfate of which is relatively insoluble, which compound on reacting with the said acid substance forms a plurality of compounds, one being a neutral and relatively insoluble salt and another a gas, the quantity of compound added being sufficient to combine with all of the $SO_4$ radical present in the precipitate.

3. The process of treating precipitated titanium hydrates containing an undesired acid substance embracing the $SO_4$ radical whereby the said undesired acid substance is eliminated, which comprises washing the precipitate and treating the washed precipitate with a compound of a metal, the sulfate of which is relatively insoluble, which compound on reacting with the said acid substance forms a plurality of compounds, one being a neutral and relatively insoluble salt and another a gas, the quantity of compound being in excess of that required to combine with all of the $SO_4$ radical present in the precipitate.

4. The process of treating precipitated titanium hydrates containing an undesired acid substance embracing the $SO_4$ radical whereby the said undesired acid substance is eliminated, which comprises washing the precipitate and treating the washed precipitate with calcium carbonate in sufficient quantity to combine with all of the $SO_4$ radical present in the precipitate.

5. The process of treating precipitated titanium hydrates containing an undesired acid substance embracing the $SO_4$ radical whereby the said undesired acid substance is eliminated and a material suitable for use as a pigment formed, which comprises washing the precipitate, treating the washed precipitate with a compound of a metal, the sulfate of which is relatively insoluble and which compound on reacting with said acid substance forms a plurality of compounds, one being a neutral and relatively insoluble salt and another a gas, the quantity of compound employed being in excess of that required to combine with all of the $SO_4$ radical present in the precipitate, and calcining the product.

6. The process of treating precipitated titanium hydrates containing an undesired acid substance embracing the $SO_4$ radical whereby the said undesired acid substance is eliminated and a material suitable for use as a pigment formed, which comprises washing the precipitate, treating the washed precipitate with calcium carbonate in excess quantity to that required to combine with all of the $SO_4$ radical present in the precipitate, and calcining the mass whereby titanium oxid is formed and the excess of calcium carbonate reacts with a portion thereof to form calcium titanate.

7. The process of treating precipitated titanium hydrates containing an undesired acid substance embracing the $SO_4$ radical whereby the said undesired acid substance is eliminated and a material suitable for use as a pigment formed, which comprises washing the precipitate, treating the washed precipitate with calcium carbonate in excess of that required to combine with all the $SO_4$ radical present in the precipitate, and calcining the mass whereby titanium oxid is formed and the excess of calcium carbonate reacts with a portion thereof to form calcium titanate and the remaining titanium oxid is changed to a crystalline modification.

8. As a new and useful article, a material suitable for use as a pigment, comprising principally titanium dioxid in a crystalline modification, calcium titanate and calcium sulfate, said material being formed by treating percipitated titanium hydrates containing an undesired acid substance embracing the $SO_4$ radical with calcium carbonate in excess of that required to combine with the $SO_4$ radical present in the precipitate and calcining the product.

Signed at Christiania, Norway, on this 14th day of September, 1917.

REIDAR NIELSEN.
VICTOR MORITZ GOLDSCHMIDT.